United States Patent
Cragel et al.

(10) Patent No.: US 9,694,672 B2
(45) Date of Patent: Jul. 4, 2017

(54) COMPLIANCE STRUCTURE FOR A DISTENSIBLE FUEL TANK

(71) Applicant: Ford Global Technologies, LLC, Dearborn, MI (US)

(72) Inventors: Daniel Frank Cragel, Livonia, MI (US); Russell Randall Pearce, Ann Arbor, MI (US); Patrick Sullivan, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 14/159,982

(22) Filed: Jan. 21, 2014

(65) Prior Publication Data

US 2014/0131125 A1 May 15, 2014

Related U.S. Application Data

(63) Continuation-in-part of application No. 13/887,192, filed on May 3, 2013, which is a continuation-in-part of application No. 13/597,233, filed on Aug. 28, 2012, now Pat. No. 8,657,051, which is a
(Continued)

(51) Int. Cl.
| | |
|---|---|
| *B60K 15/00* | (2006.01) |
| *B60K 15/03* | (2006.01) |
| *B60K 15/077* | (2006.01) |
| *B65D 1/42* | (2006.01) |
| *B65D 90/52* | (2006.01) |
| *B60K 15/073* | (2006.01) |

(52) U.S. Cl.
CPC ........ *B60K 15/03* (2013.01); *B60K 15/03177* (2013.01); *B60K 15/073* (2013.01); *B60K 15/077* (2013.01); *B65D 1/42* (2013.01); *B65D 90/52* (2013.01); *B60K 2015/0344* (2013.01); *B60K 2015/03171* (2013.01); *B60Y 2200/92* (2013.01)

(58) Field of Classification Search
CPC ................ B60K 15/073; B60K 15/077; B60K 15/03177; B60K 15/03; B60K 2015/0344; B60K 2015/03171; B60Y 2200/92; B60P 3/221; F17C 1/02; F17C 1/08; F17C 2203/011; F17C 2203/012; F17C 2270/0168; F17C 2270/0178; B65D 90/52; B65D 1/42; B65D 1/44; B65D 1/46

See application file for complete search history.

(56) References Cited

U.S. PATENT DOCUMENTS

| | | |
|---|---|---|
| 2,144,945 A | 1/1939 | Sutton |
| 2,451,131 A | 10/1948 | Vidal et al. |
| 2,860,809 A | 11/1958 | Perry |

(Continued)

FOREIGN PATENT DOCUMENTS

| | | | | |
|---|---|---|---|---|
| DE | 102007026817 B3 | * | 10/2008 | ....... B60K 15/03177 |
| JP | H07257493 A | | 10/1995 | |

*Primary Examiner* — J. Allen Shriver, II
*Assistant Examiner* — Steve Clemmons
(74) *Attorney, Agent, or Firm* — James Dottavio; McCoy Russell LLP

(57) ABSTRACT

A distensible fuel tank included in a vehicle, comprising a housing and a compliance structure coupled to the housing, the compliance structure including a support element coupled to a first side of a structural element and a reinforcing element coupled to a second opposing side of the structural element.

20 Claims, 5 Drawing Sheets

Related U.S. Application Data continuation-in-part of application No. 12/815,283, filed on Jun. 14, 2010, now Pat. No. 8,251,171.

(56) References Cited

U.S. PATENT DOCUMENTS

| | | | |
|---|---|---|---|
| 2,982,441 A | 5/1961 | Farrell et al. | |
| 3,102,972 A * | 9/1963 | Andresen | B60B 19/06 |
| | | | 280/836 |
| 3,246,789 A * | 4/1966 | Progler | F17C 3/025 |
| | | | 220/560.11 |
| 3,501,367 A | 3/1970 | Parker | |
| 3,538,661 A * | 11/1970 | Nelson | 52/246 |
| 3,544,146 A * | 12/1970 | Asenbauer | B65D 43/0212 |
| | | | 229/125.21 |
| 4,399,850 A | 8/1983 | Schiemann | |
| 4,699,291 A * | 10/1987 | Prais | B65D 45/30 |
| | | | 206/1.5 |
| 4,964,531 A | 10/1990 | Caniglia et al. | |
| 5,209,369 A * | 5/1993 | Della-Penna | 220/681 |
| 5,647,933 A | 7/1997 | Christensen | |
| 5,960,981 A | 10/1999 | Dodson et al. | |
| 6,138,859 A | 10/2000 | Aulph et al. | |
| 6,293,420 B1 | 9/2001 | Richter et al. | |
| 6,408,979 B1 | 6/2002 | Forbes et al. | |
| 6,431,388 B1 | 8/2002 | Spickelmire et al. | |
| 6,595,382 B2 | 7/2003 | Ettlinger | |
| 6,691,889 B1 | 2/2004 | Falk | |
| 6,820,762 B2 * | 11/2004 | Berg, Sr. | 220/560.03 |
| 7,073,850 B2 * | 7/2006 | Erney et al. | 296/203.04 |
| 7,111,750 B2 | 9/2006 | Gulati et al. | |
| 7,541,085 B2 | 6/2009 | Burdon | |
| 8,596,488 B2 * | 12/2013 | Kawamoto | B60K 15/073 |
| | | | 220/562 |
| 2002/0066737 A1 | 6/2002 | Stack et al. | |
| 2007/0194051 A1* | 8/2007 | Bakken et al. | 222/173 |
| 2009/0250458 A1* | 10/2009 | Criel | B29C 51/12 |
| | | | 220/4.13 |
| 2010/0045017 A1 | 2/2010 | Rea | |
| 2010/0237080 A1* | 9/2010 | Gebert et al. | 220/562 |
| 2011/0062163 A1 | 3/2011 | Hewkin | |
| 2011/0303684 A1 | 12/2011 | Cragel et al. | |

* cited by examiner

COMPLIANCE STRUCTURE FOR A DISTENSIBLE FUEL TANK

CROSS REFERENCE TO RELATED APPLICATIONS

The present application is a continuation-in-part of U.S. patent application Ser. No. 13/887,192, entitled "COMPLIANCE STRUCTURE FOR A DISTENSIBLE FUEL TANK," filed May 3, 2013, which is a continuation-in-part of U.S. patent application Ser. No. 13/597,233, entitled "LATTICE STRUCTURE FOR A DISTENSIBLE FUEL TANK," filed Aug. 28, 2012, which is a continuation-in-part of U.S. patent application Ser. No. 12/815,283, entitled "LATTICE STRUCTURE FOR A DISTENSIBLE FUEL TANK," filed Jun. 14, 2010, now U.S. Pat. No. 8,251,171, the entire contents of each of which are incorporated herein by reference for all purposes.

BACKGROUND/SUMMARY

Fuel tanks may experience increased pressure during certain operating conditions. The increased pressure may be caused by an increase in the temperature in a sealed fuel tank. The duration that a fuel tank is sealed may be increased in hybrid vehicles using both an electric motor and an internal combustion engine for motive power when compared to vehicles relying solely on internal combustion engines for motive power. The increase may be due, in part, to the sporadic use of the internal combustion engine in the hybrid vehicle. Consequently, the pressure in a fuel tank of a hybrid vehicle may reach levels that are many times greater than those experienced in systems where the fuel tank is routinely purged to the engine whenever necessary. In some circumstances the pressure in a fuel tank of a hybrid vehicle may be 15-20 times greater than the maximum values experienced by a fuel tank in a vehicle relying solely on an internal combustion engine for motive power.

Thicker fuel tanks have been used to withstand the increased pressure within the fuel tank, such as heavier gauge metal fuel tanks However, the inventors herein have recognized various shortcomings of the above approach. For example, fuel tanks having increased wall thickness may not only increase vehicle costs, but may also increase the weight and size of the fuel tank. Moreover, the shape of the fuel tank housing may be selected based on the strength of the design rather than on the compactness of the design, thereby decreasing the compactness of the vehicle or the fuel tank's storage capacity. Consequently the vehicle's driving range may be decreased.

As such, various example systems and approaches are described herein. In one example, a distensible fuel tank included in a vehicle is provided. The distensible fuel tank includes a housing and a compliance structure coupled to the housing, the compliance structure including a support element coupled to a first side of a structural element and a reinforcing element coupled to a second opposing side of the structural element.

The compliance structure provides a desired amount of flexibility and strength to selected areas of the fuel tank. Specifically, the reinforcing element provides a greater amount of structural integrity to the fuel tank where desired. Additionally, structural characteristics of the compliance structure may be tuned to achieve specified fuel tank attributes. The geometric characteristics (e.g., width, length, etc.) of the reinforcing element may vary. In this way, the compliance structure may be tuned for a variety of fuel tank geometries, and therefore may be used across a wide range of fuel tanks As a result, the applicability of the fuel tank is increased, thereby reducing fuel tank production costs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE FIGURES

FIG. 3 is drawn approximately to scale, however other relative dimension may be used, if desired.

DETAILED DESCRIPTION

A fuel tank with a compliance structure is disclosed herein. The compliance structure includes a reinforcing element extending between structural elements coupled to an interior surface of a housing of the tank. Fuel tank attributes such as deflection characteristics, structural integrity, material construction (e.g., material tolerances), heat transfer characteristics, etc., may be predetermined and the structural characteristics of the compliance structure may be subsequently tuned to achieve the desired attributes. For example, a thickness, spacing, angular position, vertical height, etc., of the reinforcing element, support element, and/or structural element may be varied to tune the compliance structure to the shape of a specified fuel tank. In this way, the features of the compliance structure may be adapted for a wide range of fuel tanks, thereby increasing the fuel tanks applicability. Moreover, the likelihood of fuel tank degradation (e.g., deformation, housing rupture, etc.,) caused by over-pressure conditions may be reduced when a compliance structure with a reinforcing element is used in a fuel tank.

Figure 1:
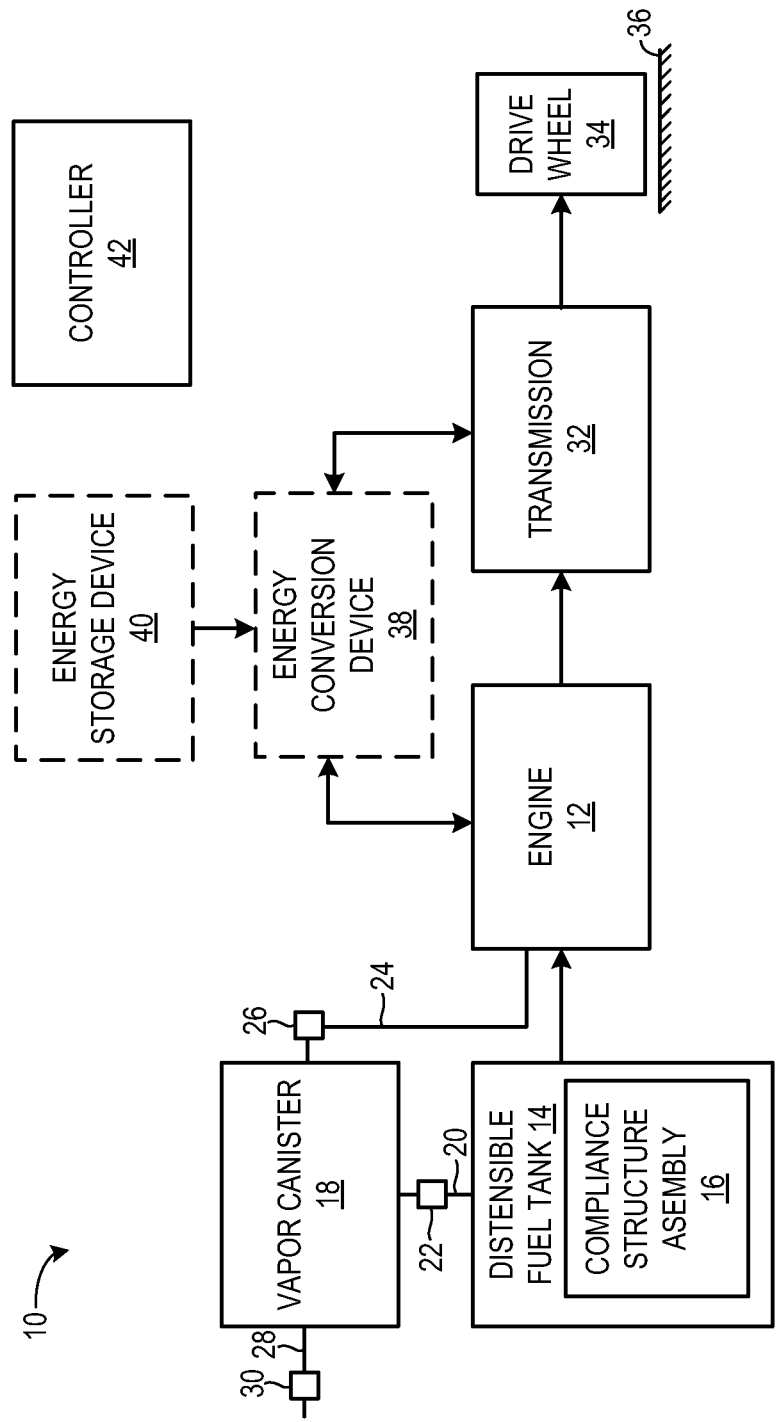
FIG. 1 shows a schematic depiction of a system in a vehicle including a distensible fuel tank having a distensible structure.

Referring to FIG. 1, a system 10 for a vehicle is shown. The system includes an internal combustion engine 12 coupled to a distensible fuel tank 14. The fuel tank may include a distensible structure assembly 16 (e.g., lattice structure assembly) for providing increased structural integrity as well as a predetermined amount of compliance to the fuel tank, discussed in greater detail herein with regard to FIG. 3-6.

System 10 may further include a vapor canister 18. The vapor canister may be fluidly coupled to fuel tank 14 via a tank conduit 20 including a fuel tank isolation valve 22. The vapor canister may also be coupled to the engine via an engine conduit 24 including a canister purge valve 26. Furthermore, a vent conduit 28 including a canister vent valve 30 may be coupled to the vapor canister. The vent conduit may be in fluidic communication with the surrounding air.

However in other examples, the system 10 may not include the tank conduit 20 and the fuel isolation valve 22. In such an example, the distensible fuel tank 14 is not in fluidic communication (e.g., direct fluidic communication) with the vapor canister 18. Therefore, the distensible fuel tank 14 is fluidly separated (e.g., isolated) from the vapor canister 18. Such a system may be referred to as a non-integrated refueling only system (NIRCOS). It will be appreciated that in this example a refueling tube may be in fluidic communication with the vapor canister 18. The refueling tube may provide fuel to the distensible fuel tank 14. Therefore, vapors may be directed to the vapor canister 18 during refueling in the NIRCOS.

It will be appreciated that the aforementioned valves (i.e., fuel tank isolation valve 22, canister purge valve 26, and canister vent valve 30) may be selectively operated to perform the following operations: vapor canister purging, fuel tank isolation, and refueling. Vapor canister purging operation may be performed when the internal combustion engine is in operation and a sufficient vacuum is generated in the engine's intake manifold. However, it will be appreciated that in certain vehicles, such as hybrid vehicles, the internal combustion engine may be sporadically operated during vehicle operation.

Continuing with FIG. 1, internal combustion engine 12 may also be coupled to a transmission 32. The transmission may be a manual transmission, automatic transmission, or combinations thereof. Further, various additional components may be included in the transmission, such as a torque converter, and/or other gears such as a final drive unit, etc. Transmission 32 is shown coupled to drive wheel 34, which in turn is in contact with road surface 36. Although a single drive wheel is depicted it will be appreciated that a plurality of drive wheels may be coupled to transmission 32.

In this example embodiment, system 10 also includes an energy conversion device 38, which may include a motor, a generator, among others and combinations thereof. Energy conversion device 38 is further shown coupled to an energy storage device 40, which may include a battery, a capacitor, a flywheel, a pressure vessel, etc. However in other embodiments system 10 may not include the energy conversion device and the energy storage device. Hence, in some embodiments the internal combustion engine may be the sole source of motive power in the vehicle.

Energy conversion device 38 can be operated to absorb energy from vehicle motion and/or the engine and convert the absorbed energy to an energy form suitable for storage by the energy storage device (i.e., provide a generator operation). The energy conversion device can also be operated to supply an output (power, work, torque, speed, etc.) to drive wheel 34 and/or engine 12 (i.e. provide a motor operation). It will be appreciated that the energy conversion device may, in some embodiments, include only a motor, only a generator, or both a motor and generator, among various other components used for providing the appropriate conversion of energy between the energy storage device and the drive wheel and/or engine.

The depicted connections between engine 12, energy conversion device 38, transmission 32, and drive wheel 34 indicate transmission of mechanical energy from one component to another, whereas the connections between the energy conversion device and the energy storage device may indicate transmission of a variety of energy forms such as electrical, mechanical, etc. For example, torque may be transmitted from engine 12 to drive the drive wheel 34 via transmission 32. As described above energy storage device 40 may be configured to operate in a generator mode and/or a motor mode. In a generator mode, energy conversion device 38 absorbs some or all of the output from engine 12 and/or transmission 32, which reduces the amount of drive output delivered to drive wheel 34, or the amount of braking torque to the drive wheel. Such operation may be employed, for example, to achieve efficiency gains through regenerative braking, improved engine efficiency, etc. Further, the output received by the energy conversion device may be used to charge energy storage device 40. In motor mode, the energy conversion device may supply mechanical output to engine 12 and/or transmission 32, for example by using electrical energy stored in an electric battery. In some examples, combustion cycles in the engine may be inhibited in motor mode.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 1 may be controlled by a vehicle controller 42.

It will be appreciated that the vehicle controller may be configured to seal the fuel tank during certain operating conditions, such as when engine 12 is not providing motive power to the vehicle, to decrease evaporative emissions. For example, the vehicle may be operated in the motor mode in which the energy conversion device provides motive power to the vehicle and combustion cycles in the engine are substantially inhibited. Inhibiting combustion cycles in the engine may include inhibiting fuel injection events, inhibiting operation of the fuel delivery system pumps, and isolating the fuel delivery system. Isolation of the fuel tank may include substantially inhibiting fluidic communication with the fuel delivery system and the atmosphere. In other words, the fuel tank may be sealed. Furthermore it will be appreciated that operation of internal combustion engine 12 may be inhibited when the vehicle is travelling below a threshold speed or when the vehicle has not surpassed a threshold range corresponding to an amount of energy stored within the energy storage device. Therefore, when the vehicle is driven for a short duration or below a threshold speed, the fuel tank may be sealed. During the aforementioned conditions fluctuations in temperature may cause the pressure in the fuel tank to increase above atmospheric levels. In some vehicle the fuel tank may experience pressure 15-20 times greater than the atmospheric pressure.

Figure 2:
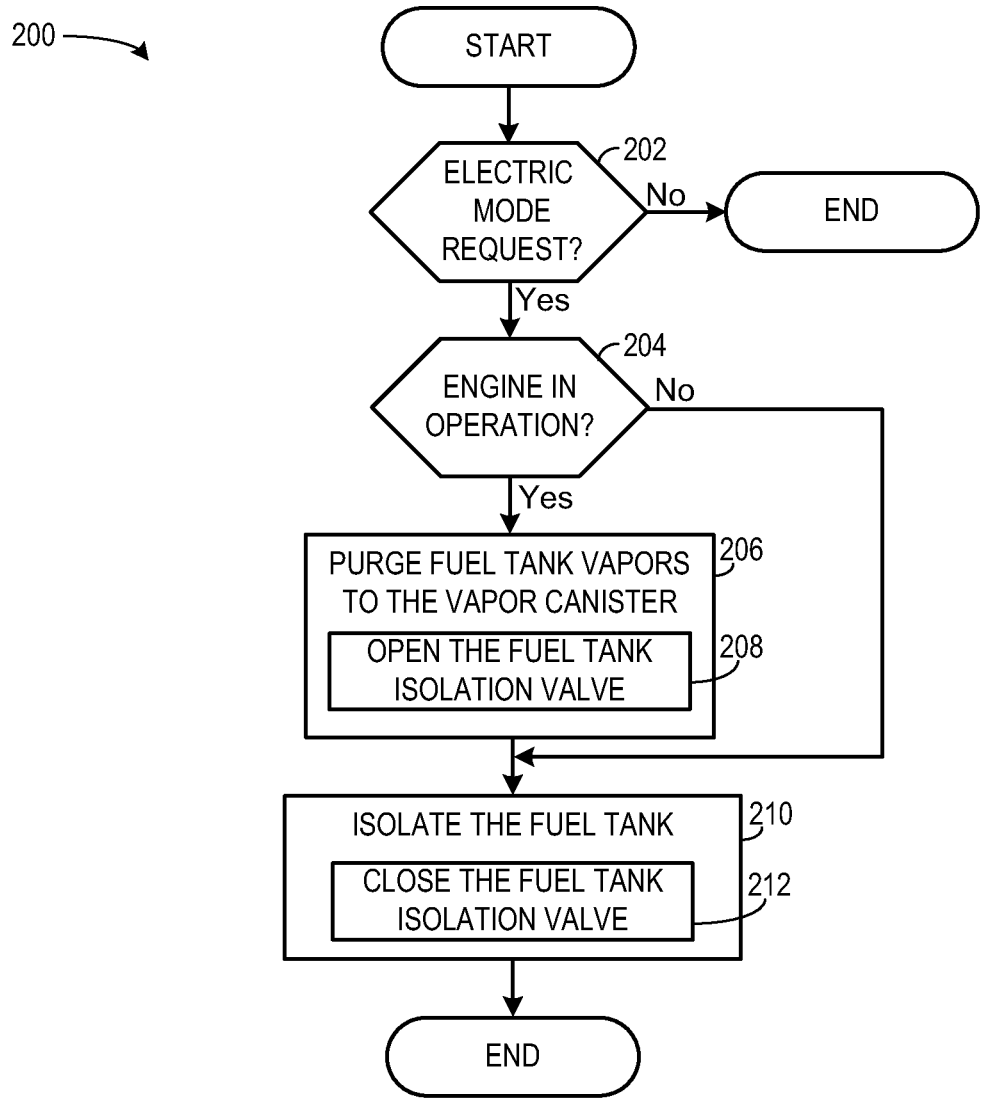
FIG. 2 shows a method for operation of a vehicle.

FIG. 2 shows a method 200 for operation of a vehicle. Method 200 may be performed via the systems and components described herein. However, in other examples method 200 may be implemented via other suitable systems and components.

At 202 the method includes determining if an electric mode has been requested. It will be appreciated that an electric mode may include a mode of vehicle operation in which an electric motor is providing motive power to the vehicle and the internal combustion engine is not in operation.

If it is determined that an electric mode request has not been made (NO at 202) the method ends. However, if it is determined that an electric mode request has been made (YES at 202) the method proceeds to 204 where the method includes determining if the engine is in operation. If the engine is in operation (YES at 204) the method includes at 206 purging fuel tank vapors to the vapor canister. In some examples, purging fuel tank vapors to the vapor canister may include at 208 opening the fuel tank isolation valve. However, it will be appreciated that in other examples, other valves may be operated to purge fuel tank vapors to the vapor canister.

Next at 210 the method includes isolating the fuel tank. In some examples isolating the fuel tank may include at 212 closing the fuel tank isolation valve. However it will be appreciated that in other embodiments alternate valves may be operated to isolate the fuel tank. However, if it is determined that the engine is not in operation (NO at 204) the method proceeds to 210. After 210 method 200 ends or alternatively, in other embodiments, returns to the start.

Method 200 may decrease evaporative emission from a hybrid type vehicle via selectively transferring vapors in the fuel tank to the vapor canister during engine operation and sealing the fuel tank and vapor canister while the vehicle is utilizing the electric motor for motive power. The duration that the fuel tank remains sealed may be greater in an electric vehicle utilizing method 200 when compared to a vehicle relying solely on an internal combustion engine for motive power.

Figure 3:
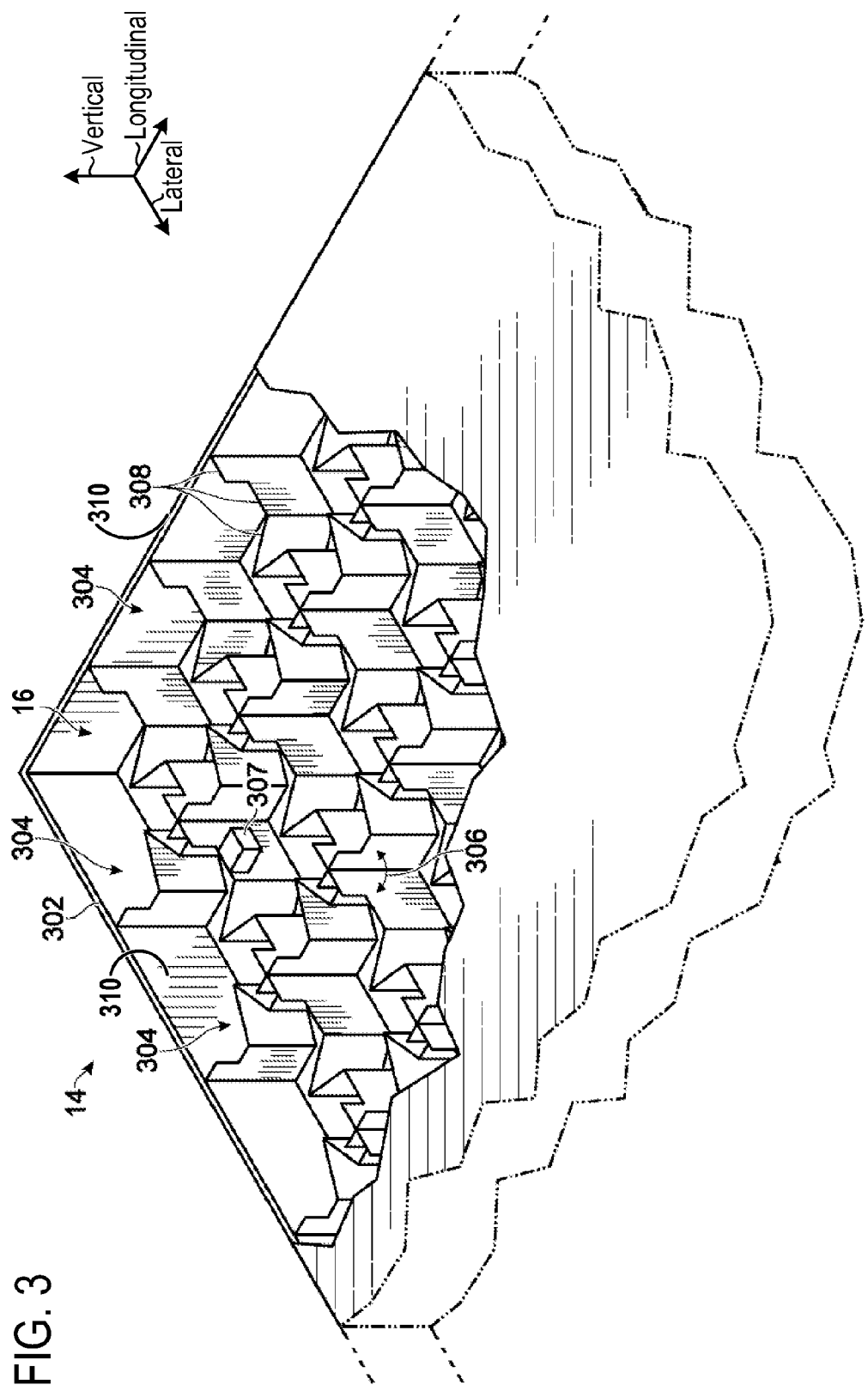
FIG. 3 shows an illustration of a distensible fuel tank including a compliance structure assembly.

FIG. 3 shows an illustration of distensible fuel tank 14. Fuel tank 14 may include a housing 302 enclosing a compliance structure assembly 16. In the example depicted in FIG. 3 the compliance structure assembly may be referred to as a lattice structure. The lattice structure 16 provides controlled support to the fuel tank. The lattice structure may substantially span a portion of an interior of the fuel tank defined by the housing. In the depicted embodiment, a section of the housing has been removed to reveal the interior of the fuel tank and the internal lattice structure. However, it will be appreciated that the housing does in fact enclose the lattice structure. Housing 302 may be constructed out of a material that expands and contracts during operation of the vehicle. For example, housing 302 may be constructed out of a polymeric material, such as a high density polyethylene (HDPE), a metal, or a combination thereof Additionally, the lattice structure may be constructed out of a suitable material such as a polymeric material, a metal, or a combination thereof.

The lattice structure may include a plurality of intersecting wall members 304. In some examples, the wall members may be conjoined. However, in other examples, the wall members may be attached in another suitable manner. In the depicted embodiment, angle 306 formed by the intersection of the wall member is substantially perpendicular. In this way, multi-axial loading of the lattice structure may be equally distributed. In one example, the intersection may include two pairs of identical supplementary angles. A sub-assembly 307 may be coupled to one or more of wall members 304. The sub-assembly may be a sensor, an internal mounted fuel or vapor line, etc.

Each wall member may include a plurality of panels 308 arranged in a repeating pattern. In the depicted embodiment the sides of the panels are planar. However in other embodiments the sides of the panels may have another suitable shape. For example, the panels may be curved. Further, in the depicted embodiment wall members 304 are positioned substantially perpendicular to housing walls 310. In this way, the wall members provide structural support to the fuel tank housing.

Although a rectangular fuel tank is illustrated it will be appreciated that fuel tanks having alternate geometries may be used in other embodiments such as saddle shaped fuel tank. Furthermore, it will be appreciated that fuel tank may be positioned in a number of orientations in the vehicle.

Figure 4:
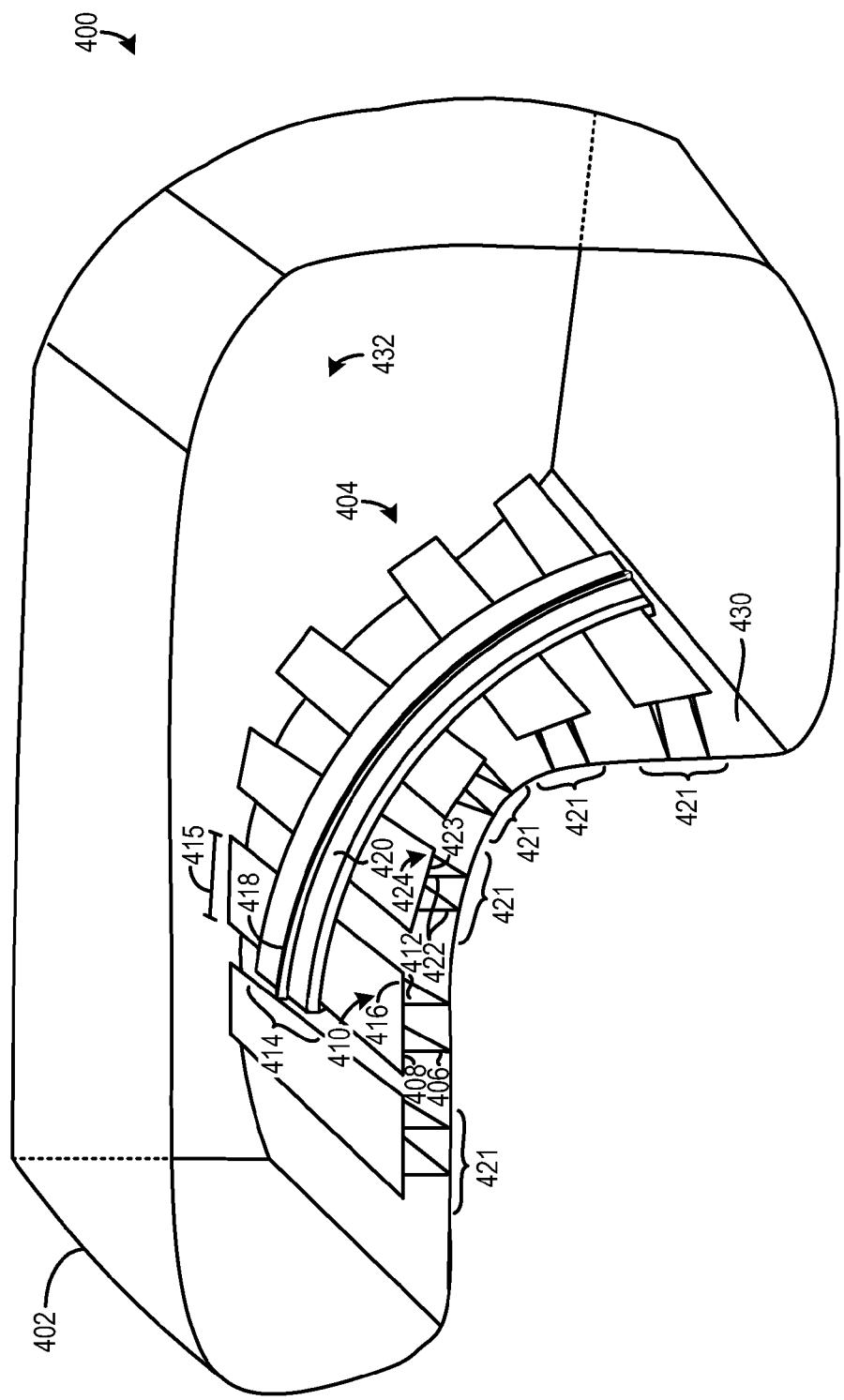
FIG. 4 shows an illustration of another distensible fuel tank including a compliance structure.

FIG. 4 shows an illustration of a second example distensible fuel tank 400. The distensible fuel tank 400 includes a housing 402 enclosing a compliance structure 404. It will be appreciated that the compliance structure 404 may be utilized as the compliance structure assembly 16 shown in FIG. 1, and may further include features from the example show in FIG. 3. Continuing with FIG. 4, the compliance structure 404 spans an internal volume 432 of the fuel tank 400. In this example, the fuel tank 400 has a less deep shelf region on the left-hand side of the figure as compared to the depth of the region on the right-hand side of the figure. The compliance structure 404 may span the transition of the shelf from the less deep to the deeper region of the fuel tank. Note that the fuel tank may be sealed during vehicle operation, via one or more valves, including when the engine is operating and not operating.

In one example, the compliance structure includes a first support element 406 coupled to a bottom side 408 of a structural element 410. The compliance structure 404 further includes a second support element 412 coupled to the bottom side of the structural element 410. It will be appreciated that the support elements (406 and 412) may be coupled to other sides of the structural element 410. The support elements (406 and 412) and structural element 410 have planar surfaces in the depicted example. However, other contours of the support elements and/or structural elements have been contemplated.

The first support element 406, the second support element 412, and/or the structural element 410 may form a continuous piece of material, in one example. For instance, the support elements and the structural element may be extruded. Extruding these elements may decrease manufacturing costs. However, other manufacturing techniques have been contemplated.

The support elements (406 and 412) are arranged perpendicular to the structural element 410. However, other relative orientations between the support elements and the structural element have been contemplated. For instance, one or more of the support elements may form an angle with the structural element that is less than or equal to 90 degrees. In other examples, the first and second support elements may form angles with the structural element that are not equivalent.

The compliance structure 404 further includes a reinforcing element 414 coupled to a top side 416 of the structural element 410. It will be appreciated that the bottom side 408 and the top side 416 may be more generally referred to as a first side and a second side. The top side opposes the bottom side. The reinforcing element 414 provides reinforcement to other portions of the compliance structure 404, thereby increasing the structural integrity of the compliance structure and the fuel tank as a whole. As a result, the thickness of the housing 402 may be reduced if desired, thereby decreasing the profile of the fuel tank. The reinforcing element 414 includes a reinforcing rib 418 extending along a top surface 420 of a base of the reinforcing element 414. In the depicted example, the reinforcing rib extends down an entire length (e.g., longitudinal length) of the top surface 420. However, in other examples the reinforcing rib 418 may only extend down a portion of the length or width of the top surface 420.

The reinforcing element 414 may include or be constructed out of a different material than the first and second support elements (406 and 412) and the structural element 410, in one example. However, in other examples the reinforcing element, the support elements, and the structural element may be constructed out of a similar material. The material used to construct one or more of the reinforcing element, support elements, structural elements, and/or housing may include a polymeric material such as high density polyethylene (HDPE), a metal, etc. Additionally, the reinforcing element 414 is curved along its length in the depicted example. However, other reinforcing element geometries have been contemplated. It will be appreciated that various characteristics (i.e., size and geometry) of the reinforcing element may be altered to achieve desired structural reinforcement characteristics in different fuel tank applications. For instance, a width, thickness, and/or a length of the reinforcing element may be adjusted based on the shape of the housing. In this way, the compliance structure may be used in a wide variety of fuel tanks, thereby increasing the adaptability of the compliance structure. Additionally, the size and/or geometry of the support elements and structural elements may be adjusted based on the shape of the housing.

The reinforcing rib 418 has a triangular cross-section, in the depicted example. The cutting plane of the cross-section is a plane perpendicular to a line tangent to an outer surface of the reinforcing rib. The triangular cross-section provides increased reinforcement to the compliance structure. However, other reinforcing rib geometries have been contemplated. For example, the reinforcing rib 418 may have a square, round, or rectangular cross-section. Additionally, the reinforcing element is positioned vertically above the support elements (406 and 412) and the structural element 410. However, other arrangements of compliance structure components have been contemplated. The structural element 410 is positioned between the reinforcing element 414 and the support elements (406 and 412). However other relative positions of the compliance structure components have been contemplated. Additionally, the reinforcing element 414 spans a width 415 of the structural element 410, in the depicted example. In other words, the reinforcing element may extend across the width of the structural element.

The compliance structure 404 may further include other substructures 421 having two support elements 422 coupled a bottom side 423 of a structural element 424. However, in other examples the compliance structure 404 may include only the first and second support elements (406 and 412), structural element 410, and reinforcing element 414. The substructures 421 are spaced away from one another and spaced away from the support elements (406 and 412) and the structural element 410, in the depicted example. However, in other examples a portion of the substructures 421 may be in contact with one another. A portion of the additional substructures 421 may be coupled to the reinforcing element 414 and another portion of the substructures 421 may not be coupled to the reinforcing element. However in other examples, all of the substructures 421 may be coupled to the reinforcing element 414. Additionally, the reinforcing element 414 may extend between the structural element 410 and one or more of the substructures 421 and specifically structural elements 424 in the substructures 421.

It will be appreciated that the size, geometry, and/or location between the substructures 421 may vary between the substructures. However, in other examples the size and/or geometry between the two or more of the substructures may be substantially identical. It will be appreciated that in other examples, the extensible fuel tank may include a plurality of compliance structures, each structure having a support element coupled to a structural element.

In the depicted example, the substructures 421 are arranged along an interior surface 430 of the housing 402. A portion of the interior surface 430 is curved, creating a shelf-shaped fuel tank. However, other interior surface geometries have been contemplated. In other examples, at least a portion of the compliance structure 404 may be positioned external to the housing 402. Additionally, the support elements (406 and 412) and the structural element 410 are coupled to a portion of the interior surface 430, in the depicted example. Furthermore, the reinforcing element 414 is spaced away from the interior surface 430. However, in other examples the reinforcing element may be coupled to the interior surface 430.

In this way, the fuel tank walls can be reinforced while maintaining improved manufacturing process.

As illustrated in FIG. 4, a plurality of laterally positioned pi-shaped crossing elements can be arranged in parallel with one another and along the transition from a less deep to a more deep region of the fuel tank, where the fuel tank has a flat top spanning along the transition. Reinforcement may be provided by a longitudinally positioned reinforcing element spanning across a top of a plurality of the pi-shaped crossing elements, a bottom surface of which is attached to the top surfaces of the crossing elements. A plurality of parallel and longitudinally positioned reinforcing elements may be provided, but spaced apart from each other.

Figure 5:
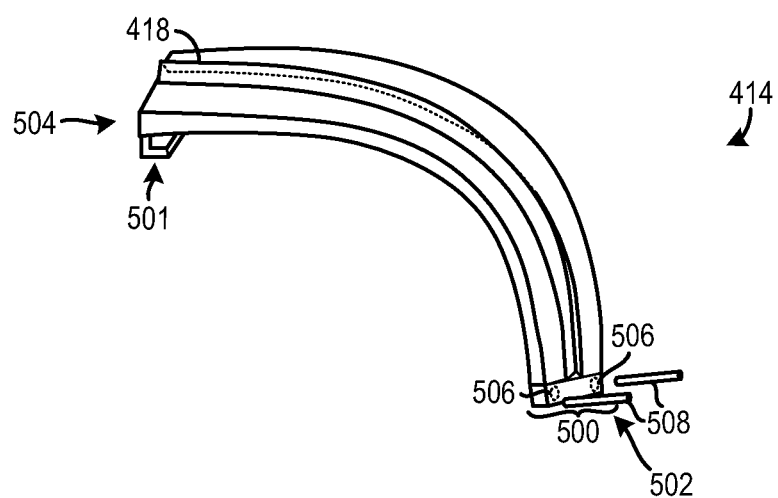
FIG. 5 shows an illustration of a reinforcing element included in the compliance structure shown in FIG. 4.
Figure 6:
FIG. 6 shows another illustration of another example of a reinforcing element which may be included in a compliance structure.

FIG. 5 shows an illustration of the reinforcing element 414 included in the compliance structure 404, shown in FIG. 4. The reinforcing rib 418 of the reinforcing element 414 is shown in FIG. 5. The reinforcing element 414 includes attachment apparatuses (500 and 501). The attachment apparatuses (500 and 501) may be coupled to the structural element 410, shown in FIG. 4. The attachment apparatuses (500 and 501) are arranged at opposing ends (502 and 504) of the reinforcing element 414. The attachment apparatus 501 is a clip. It will be appreciated that the clip may be in face sharing contact with the opposing sides (416 and 408) of the structural element 410 shown in FIG. 4. The attachment apparatus 500 includes openings 506. Fasteners 508 may extend through the openings 506 and attach to the structural element 410 shown in FIG. 4. The fasteners 508 may be bolts, screws, pins, etc. Additionally or alternatively, the reinforcing element 414 may be attached to the structural element 410 via an adhesive. The attachment apparatuses (500 and 501) enable the reinforcing element 414 to be incorporated into the compliance structure at a late stage in the manufacturing process. As a result, the reinforcing structure may be altered at a late stage in the manufacturing process, enabling the compliance structure to be used in a variety of different fuel tanks FIG. 6 shows another example reinforcing element 600 having a reinforcing rib 602. The reinforcing element 600 may be included in a compliance structure in a fuel tank. As discussed above the reinforcing element provide a greater amount of structural integrity to the housing of the fuel tank. As a result, the fuel tank can withstand greater internal pressures and/or the thickness of the housing may be reduced, thereby reducing the profile of the fuel tank, if desired.

FIGS. 1-6 provide for a distensible fuel tank included in a vehicle, comprising a housing and a compliance structure coupled to the housing, the compliance structure including a support element coupled to a first side of a structural element and a reinforcing element coupled to a second opposing side of the structural element.

FIGS. 1-6 further provide for a distensible fuel tank where the compliance structure includes a second support element coupled to a second structural element spaced away from the first support element and the first structural element and the reinforcing element extends between the first structural element and the second structural element.

FIGS. 1-6 further provide for a distensible fuel tank where the reinforcing element is coupled to the structural element via an attachment apparatus. FIGS. 1-6 further provide for a distensible fuel tank where the attachment apparatus includes a clip in face sharing contact with the opposing sides of the structural element. FIGS. 1-6 further provide for a distensible fuel tank where the attachment apparatus includes an opening in the reinforcing element coupled to the structural element via a fastener extending through the opening. FIGS. 1-6 further provide for a distensible fuel tank where the reinforcing element includes a reinforcing rib extending along a length of a top surface of the reinforcing element. FIGS. 1-6 further provide for a distensible fuel tank where the reinforcing rib has a triangular cross-section. FIGS. 1-6 further provide for a distensible fuel tank where the reinforcing rib extends across a longitudinal length of the reinforcing element.

FIGS. 1-6 further provide for a distensible fuel tank where the support element and the structural element form a continuous piece of material and the reinforcing element includes a different material than the support element and the structural element. FIGS. 1-6 further provide for a distensible fuel tank where the reinforcing element spans a width of the structural element. FIGS. 1-6 further provide for a distensible fuel tank where the compliance structure further includes a second support element coupled to the structural element.

FIGS. 1-6 further provide for a distensible fuel tank where a side the second structural element is coupled to the first side of the first structural element, the first and second structural elements forming an angle.

FIGS. 1-6 further provide for a distensible fuel tank where the angle is less than or equal to 90 degrees. FIGS. 1-6 further provide for a distensible fuel tank where the compliance structure spans an internal volume of the distensible fuel tank and the reinforcing element is spaced away from the housing.

FIGS. 1-6 also provide for a distensible fuel tank included in a vehicle, comprising a housing and a compliance structure coupled to the housing, the compliance structure including a first support element and a second support element coupled to a bottom surface of a structural element and a reinforcing element coupled to a top surface of structural element, where the first and second support element are arranged perpendicular to the structural element.

FIGS. 1-6 further provide for a distensible fuel tank where the structural element is coupled to an interior surface of the housing. FIGS. 1-6 further provide for a distensible fuel tank where the reinforcing element extends across a width of the structural element. FIGS. 1-6 provide for a distensible fuel tank included in a vehicle, comprising a housing and a compliance structure coupled to the housing, the compliance structure including a first support element coupled to a bottom side of a first structural element and a second support element in face sharing contact with a bottom side of a second structural element, the first structural element spaced away from the second structural element and the compliance structure further including a reinforcing element coupled to a top surface of both the first and second structural elements and extending between the first and second structural elements.

FIGS. 1-6 further provide for a distensible fuel tank where the reinforcing element is spaced away from an interior surface of the housing. FIGS. 1-6 further provide for a distensible fuel tank where the reinforcing element is curved along a length of the reinforcing element.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A distensible fuel tank included in a vehicle, comprising:
  a housing; and
  a compliance structure coupled to the housing, the compliance structure including a support element coupled to a first side of a structural element and a reinforcing element coupled to a second opposing side of the structural element, wherein
    the reinforcing element is coupled to the structural element via an attachment apparatus,
    the attachment apparatus includes a clip in face sharing contact with the opposing sides of the structural element, a long edge of the structural element is oriented perpendicularly to a long edge of the reinforcing element, and a width of the reinforcing element in a first direction is less than a width of the structural element in the first direction, wherein the first direction extends along the long edge of the structural element.

2. The distensible fuel tank of claim 1, where the compliance structure includes a second support element coupled to a second structural element spaced away from the first support element and the first structural element and the reinforcing element extends between the first structural element and the second structural element.

3. The distensible fuel tank of claim 1, where the attachment apparatus includes an opening in the reinforcing element coupled to the structural element via a fastener extending through the opening.

4. The distensible fuel tank of claim 1, where the reinforcing element includes a reinforcing rib extending along a length of a top surface of the reinforcing element, wherein the reinforcing rib is coupled to a first side of the reinforcing element, and wherein the structural element is coupled to a second side of the reinforcing element, the first side opposite the second side.

5. The distensible fuel tank of claim 4, where the reinforcing rib has a triangular cross-section, where the reinforcing rib is oriented perpendicularly to the long edge of the structural element, and wherein the reinforcing rib extends along an entire length of the long edge of the reinforcing element.

6. The distensible fuel tank of claim 4, where the reinforcing rib extends across a longitudinal length of the reinforcing element, and wherein the reinforcing rib extends along only a portion of the long edge of the reinforcing element.

7. The distensible fuel tank of claim 1, where the support element and the structural element form a continuous piece of material and the reinforcing element includes a different material than the support element and the structural element.

8. The distensible fuel tank of claim 1, where the reinforcing element spans a width of the structural element, and the distensible fuel tank further comprises a transition region from a less deep region of the distensible fuel tank to a more deep region of the distensible fuel tank, where the support element is coupled to the housing in the transition region, where the reinforcing element spans only the transition region, and where the distensible fuel tank further comprises a second support element coupled to the housing in the less deep region, outside the transition region, and a second structural element coupled to the second support element, where the reinforcing element is not coupled to the second structural element.

9. The distensible fuel tank of claim 1, where the compliance structure further includes a second support element coupled to the structural element.

10. The distensible fuel tank of claim 1, where a side of the support element is coupled to the first side of the structural element, the support element and the structural element forming an angle.

11. The distensible fuel tank of claim 10, where the angle is less than or equal to 90 degrees, and further comprising a second reinforcing element coupled to the second side of the structural element.

12. The distensible fuel tank of claim 1, where the compliance structure spans an internal volume of the distensible fuel tank and the reinforcing element is spaced away from the housing.

13. A distensible fuel tank included in a vehicle, comprising:

a housing;

a compliance structure coupled to the housing, the compliance structure including a first support element and a second support element coupled to a bottom surface of a structural element and a reinforcing element coupled to a top surface of the structural element, where the first and second support elements are arranged perpendicular to the structural element; and a rib coupled to the reinforcing element, wherein the structural element includes a first and a second portion, the first portion coupled to the reinforcing element and the second portion not coupled to the reinforcing element, where the first portion is a central portion of the top surface of the structural element, and where the second portion is a side portion of the top surface of the structural element, wherein a width of the reinforcing element in a first direction is less than a width of the structural element in the first direction, and wherein the first direction extends along a long edge of the structural element.

14. The distensible fuel tank of claim 13, where the first and second support elements are coupled to an interior surface of the housing in a curved transition region, the compliance structure spanning laterally across the fuel tank, the fuel tank shaped in a shelf configuration, the reinforcing element spanning longitudinally along the fuel tank including along the curved transition region, the curved transition region extending from a less deep to a deeper region of the fuel tank, a top wall of the fuel tank being substantially flat above the curved transition region, the fuel tank being sealed during vehicle operation, and wherein the rib extends along an entire length of a long edge of the reinforcing element.

15. The distensible fuel tank of claim 13, where the reinforcing element extends across the width of the structural element, the first and second support elements are coupled to the housing with a distance between them, and the structural element has a width greater than the distance, and the rib is coupled to a first side of the reinforcing element, and the structural element is coupled to a second side of the reinforcing element, the first side opposing the second side.

16. A distensible fuel tank included in a vehicle, comprising:

a housing;

a compliance structure coupled to the housing, the compliance structure including a first support element coupled to a bottom side of a first structural element and a second support element in face sharing contact with a bottom side of a second structural element, the first structural element spaced away from the second structural element and the compliance structure further including a reinforcing element coupled to a top surface of the first structural element, and not coupled to the second structural element; and a rib coupled to the reinforcing element, wherein a long edge of the reinforcing element is oriented perpendicularly to a long edge of the first structural element, wherein a width of the reinforcing element in a first direction is less than a width of the first structural element in the first direction, and wherein the first direction extends along the long edge of the first structural element.

17. The distensible fuel tank of claim 16, where the reinforcing element is spaced away from an interior surface of the housing, and where a second reinforcing element is coupled to the top surface of the first structural element and not coupled to the second structural element, and
wherein the rib is coupled to a first side of the first reinforcing element, and the first structural element is coupled to a second side of the first reinforcing element, the first side opposing the second side.

18. The distensible fuel tank of claim 16, where the reinforcing element is curved along a length of the reinforcing element, and wherein the rib extends along an entire length of the long edge of the reinforcing element.

19. The distensible fuel tank of claim 16, wherein the first structural element extends beyond an edge of the first support element, and wherein the rib extends along only a portion of an entire length of the long edge of the reinforcing element.

20. The distensible fuel tank of claim 19, wherein the first structural element comprises a first and a second portion, the first portion coupled to the reinforcing element and the second portion not coupled to the reinforcing element, wherein the first portion is a central portion of the top surface of the first structural element, and wherein the second portion is a side portion of the top surface of the first structural element.

* * * * *